(12) United States Patent
Amatt

(10) Patent No.: US 6,676,344 B1
(45) Date of Patent: Jan. 13, 2004

(54) METHODS AND APPARATUS FOR MACHINING WORKPIECES

(75) Inventor: Martin P Amatt, Derby (GB)

(73) Assignee: Rolls Royce plc, Derby (GB)

( * ) Notice: Subject to any disclaimer, the term of this patent is extended or adjusted under 35 U.S.C. 154(b) by 362 days.

(21) Appl. No.: 09/666,147

(22) Filed: Sep. 20, 2000

(30) Foreign Application Priority Data

Sep. 21, 1999 (GB) ............................................. 9922248

(51) Int. Cl.$^7$ ............................. B23C 1/00; B23Q 15/00
(52) U.S. Cl. ......................... 409/132; 409/80; 409/84; 700/172; 700/191
(58) Field of Search ........................... 409/79, 80, 84, 409/131, 132, 165, 197, 199, 221; 700/172, 182, 184, 187, 191

(56) References Cited

U.S. PATENT DOCUMENTS

| | | | | |
|---|---|---|---|---|
| 3,641,872 A | * | 2/1972 | Ulfhielm ..................... | 409/115 |
| 4,445,182 A | * | 4/1984 | Morita et al. ................ | 318/572 |
| 4,658,487 A | | 4/1987 | Gachot | |
| 5,014,421 A | * | 5/1991 | Swarden et al. ............. | 205/640 |
| 5,015,130 A | * | 5/1991 | Matsuura et al. ........... | 318/578 |
| 5,251,143 A | * | 10/1993 | Maeda ........................ | 700/172 |
| 5,351,196 A | * | 9/1994 | Sowar et al. ................ | 345/420 |
| 5,710,578 A | * | 1/1998 | Beauregard ................. | 345/429 |
| 6,099,216 A | * | 8/2000 | Momochi et al. ........... | 409/132 |

FOREIGN PATENT DOCUMENTS

| | | | | |
|---|---|---|---|---|
| EP | 0198927 | | 10/1985 | |
| GB | 2110425 A | * | 6/1983 | ................... 409/79 |
| GB | 2345026 | | 4/1999 | |
| JP | 62431 A | * | 4/1985 | ................... 409/80 |
| JP | 125754 A | * | 6/1986 | ................... 409/80 |
| JP | 36048 A | * | 2/1990 | ................... 409/80 |

* cited by examiner

*Primary Examiner*—Daniel W. Howell
(74) *Attorney, Agent, or Firm*—Pillsbury Winthrop LLP

(57) ABSTRACT

In a method for machining a workpiece, and for identifying a sequence of steps for machining a workpiece, a final shape required for the whole or part of the workpiece (is identified at 34), a three dimensional envelope shape is generated around the required shape (36), differences between the current shape and the envelope shape are generated at (38) to allow a sequence of cuts to be generated at (40) and a tool path at (42) from which the current stock part can be cut down to the envelope shape. The definition of the current stock is then updated at (44) and the sequence repeated until the workpiece has been machined to the required shape.

30 Claims, 12 Drawing Sheets

METHODS AND APPARATUS FOR MACHINING WORKPIECES

The present invention relates to the machining of workpieces, for instance during manufacture.

Many types of machine tool exist for machining workpieces by various techniques. Many of these techniques, including those of milling machines and the like, require a tool to move relative to a workpiece to create a cut which removes material from the workpiece. Machines such as CNC machines control this movement automatically, executing a sequence of cuts under automatic control. The time taken to complete the machining of a workpiece will naturally depend on the number of cuts required.

The present invention provides a method for machining a workpiece in which a final shape required for the whole or part of the workpiece is identified, an envelope shape is generated, the envelope shape wholly containing the final shape, and a sequence of one or more machining steps is identified to form the workpiece to the envelope shape, wherein identification of each machining step of the sequence takes account of the previous steps, to minimise tool movement during cutting.

Preferably an image is produced to simulate the performance of the steps of the sequence.

The sequence of machining steps is preferably used to create a tool path by which the steps may be executed. The identification of a sequence of machining steps may be dependent upon parameters such as tool size or type, the number of cuts to be used to create the envelope shape, a maximum depth of cut, and the like.

Preferably an image or sequence of images is produced to simulate the toolpath for consideration prior to machining commencing. Preferably the toolpath is encoded as a set of instructions for a machine tool.

Preferably the method is repeatedly applied to a single workpiece, the initial shape for the second and subsequent cycles being an envelope shape produced by the machine sequence of the previous cycle.

Preferably the envelope shape is three dimensional, surrounding all or part of the workpiece. The envelope shape preferably has one or more planar faces and may consist entirely of planar faces, which may be orthogonal.

The envelope shape may be a prism surrounding all or part of the length of the workpiece and having a constant cross section along an axis. The cross section may be polygonal.

The envelope shape is preferably chosen to optimise the fit of the final shape within the envelope shape. Preferably the optimisation includes the location of a planar face of the envelope shape against a planar or generally planar surface of the final shape. The envelope shape may be optimised by selecting the shape having minimum volume or cross sectional area. The optimisation process may be required to create an envelope shape having a specified number of faces.

Preferably the machining steps are cuts which may be straight cuts of an end cutting milling machine. Alternatively, the cut may be produced by a flank milling operation, during which the workpiece may be turned relative to the tool to produce non linear cutting paths across the workpiece.

The invention also provides a method of creating a sequence of machining steps for machining a workpiece, in which a final shape required for the whole or part of the workpiece is identified, an envelope shape is generated, the envelope shape wholly containing the final shape, and a sequence of one or more machining steps is identified to form the workpiece to the envelope shape wherein identification of each machining step of the sequence takes into account of the previous steps, to minimise tool movement during cutting.

Preferably an image is produced to simulate the performance of the sequence steps.

The sequence of machining steps is preferably used to create a tool path by which the steps may be executed. The identification of a sequence of machining steps may be dependent upon parameters such as tool size or type, the number of cuts to be used to create the envelope shape, a maximum depth of cut, and the like.

Preferably an image or sequence of images is produced to simulate the toolpath for consideration prior to machining commencing. Preferably the toolpath is encoded as a set of instructions for a machine tool.

Preferably the method is repeatedly applied to a single workpiece, the initial shape for the second and subsequent cycles being an envelope shape produced by the machine sequence of the previous cycle.

Preferably the envelope shape is three dimensional, surrounding all or part of the workpiece. The envelope shape preferably has one or more planar faces and may consist entirely of planar faces, which may be orthogonal.

The envelope shape may be a prism surrounding all or part of the length of the workpiece and having a constant cross section along an axis. The cross section may be polygonal.

The envelope shape is preferably chosen to optimise the fit of the final shape within the envelope shape. Preferably the optimisation includes the location of a planar face of the envelope shape against a planar or generally planar surface of the final shape. The envelope shape may be optimised by selecting the shape having minimum volume or cross sectional area. The optimisation process may be required to create an envelope shape having a specified number of faces.

Preferably the machining steps are cuts, which may be straight cuts of an end cutting milling machine. Alternatively, the cuts may be produced by a flank milling operation, during which the workpiece may be turned relative to the tool to produce non linear cutting paths across the workpiece.

The invention also provides apparatus for use in machining a workpiece, comprising final shape identification means operable to record a final shape required for the whole or part of the workpiece, envelope shape generating means operable to generate an envelope shape wholly containing the final shape, and sequence generating means operable to identify one or more machine steps to form the workpiece to the envelope shape.

Preferably the envelope shape is three dimensional, surrounding all or part of the workpiece. The envelope shape preferably has one or more planar faces and may consist entirely of planar faces, which may be orthogonal.

The envelope shape may be a prism surrounding all or part of the length of the workpiece and having a constant cross section along an axis. The cross section may be polygonal.

The envelope shape is preferably chosen to optimise the fit of the final shape within the envelope shape. Preferably the optimisation includes the location of a planar face of the envelope shape against a planar or generally planar surface of the final shape. The envelope shape may be optimised by selecting the shape having minimum volume or cross sectional area. The optimisation process may be required to create an envelope shape having a specified number of faces.

Preferably the machining steps are cuts which may be straight cuts of an end cutting milling machine.

Alternatively, the cuts may be flank milling operations, during which the workpiece may be turned relative to the tool to produce non linear cutting paths across the workpiece.

Identification of each machining step of the sequence preferably takes account of the previous steps, to minimise tool movement during cutting.

Preferably an image is produced to simulate the performance of the sequence steps.

The sequence of machining steps is preferably used to create a tool path by which the steps may be executed. The identification of a sequence of machining steps may be dependent upon parameters such as tool size or type, the number of cuts to be used to create the envelope shape, a maximum depth of cut, and the like.

Preferably an image or sequence of images is produced to simulate the toolpath for consideration prior to machining commencing. Preferably the toolpath is encoded as a set of instructions for a machine tool.

Preferably the method is repeatedly applied to a single workpiece, the initial shape for the second and subsequent cycles being an envelope shape produced by the machine sequence of the previous cycle.

The invention also provides apparatus for use in creating a sequence of machining steps for machining a workpiece, comprising final shape identification means operable to record a final shape required for the whole or part of the workpiece, envelope shape generation means operable to generate an envelope shape wholly containing the final shape, and sequence generating means operable to identify a sequence of one or more sequence steps to form the workpiece to the envelope shape.

Preferably the envelope shape is three dimensional, surrounding all or part of the workpiece. The envelope shape preferably has one or more planar faces and may consist entirely of planar faces, which may be orthogonal.

The envelope shape may be a prism surrounding all or part of the length of the workpiece and having a constant cross section along an axis. The cross section may be polygonal.

The envelope shape is preferably chosen to optimise the fit of the final shape within the envelope shape. Preferably the optimisation includes the location of a planar face of the envelope shape against a planar or generally planar surface of the final shape. The envelope shape may be optimised by selecting the shape having minimum volume or cross sectional area. The optimisation process may be required to create an envelope shape having a specified number of faces.

Preferably the machining steps are cuts which may be straight cuts of an end cutting milling machine. Alternatively, the cut may be produced by a flank milling operation, during which the workpiece may be turned relative to the tool to produce non linear cutting paths across the workpiece.

Identification of each machining step of the sequence preferably takes account of the previous steps, to minimise tool movement during cutting.

Preferably an image is produced to simulate the performance of the sequence steps.

The sequence of machining steps is preferably used to create a tool path by which steps may be executed. The identification of a sequence of machining steps may be dependent upon parameters such as tool size or type, the number of cuts to be used to create the envelope shape, a maximum depth of cut, and the like.

Preferably an image or sequence of images is produced to simulate the toolpath for consideration prior to machining commencing. Preferably the toolpath is encoded as a set of instructions for a machine tool.

Preferably the method is repeatedly applied to a single workpiece, the initial shape for the second and subsequent cycles being an envelope shape produced by the machine sequence of the previous cycle.

In a second aspect, the invention provides a method of simulating an article, in which the article is notionally divided into objects, an image of each object is stored, each object image being stored in association with reference data representing the position of the corresponding object relative to the complete article or to a frame of reference common to all objects, whereby objects may be viewed individually or in groups, the reference data being used to cause the images of a group to be viewed with the objects shown in their correct positions and orientations relative to each other.

The invention also provides simulation apparatus comprising storage means operable to store data representing images of part of an article, and display means operable to use stored data to create an image of one or more parts of an article, wherein data representing an image of a part of an article is stored in association with reference data representing the position of a corresponding article part relative to the complete article or a frame of reference common to all article parts, whereby the display means is operable, by use of the reference data, to create an image of more than one article part in which the article parts are shown in their correct positions and orientations relative to each other.

Means are preferably provided to receive a user selection of objects and to use the reference data to form a group image including the selected objects in their correct relative positions and orientations. An image of each object is preferably stored as a separate CAD object within a common CAD data file. Likewise, each group image is preferably stored as an object CAD file.

Examples and embodiments of the present invention will now be described in more detail, by way of example only, and with reference to the accompanying drawings, in which.

The examples relate to the simulation, i.e. the creation of an image of an article to be produced by means of a machine tool or the like, in order to create data for instructing automatic operation of the machine tool to produce an article of the required shape.

Figure 1:
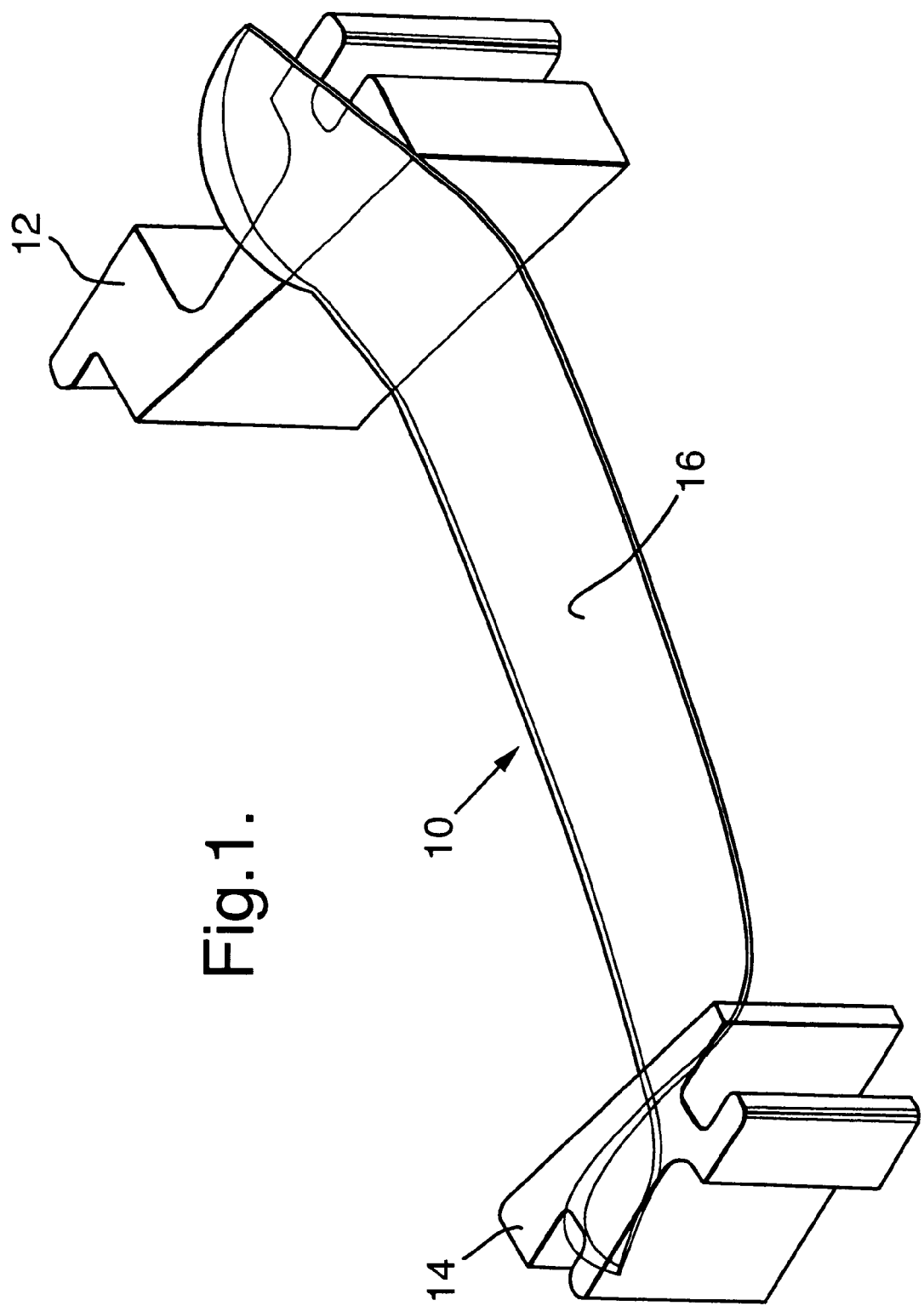
FIG. 1 is a perspective view of a compressor blade for a gas turbine engine.

FIG. 1 shows one example of an article to which the invention may be applied. The article 10 is a compressor stator blade for the compressor of a gas turbine engine. The blade 10 is formed from a single piece of material and includes a root portion 12, a shroud portion 14 and a blade (or aerofoil) portion 16. The shape of the blade 10 is generally conventional in itself. The invention could also be applied to the manufacture of compressor rotor blades, which have root and blade portions reminiscent of the portions 12, 16, but no shroud portion. It is to be noted that the shape of these blades is intricate and has conventionally been difficult, slow and expensive to machine.

FIGS. 2 to 12 indicate steps by which production of blades, such as the blade 10 of FIG. 1, may be planned and executed, in accordance with the invention. In FIGS. 2 to 12, the illustrated blade 10 is a compressor stator blade, having shroud features, but it will be clear that a rotor blade could be produced in similar manner.

Figure 2:
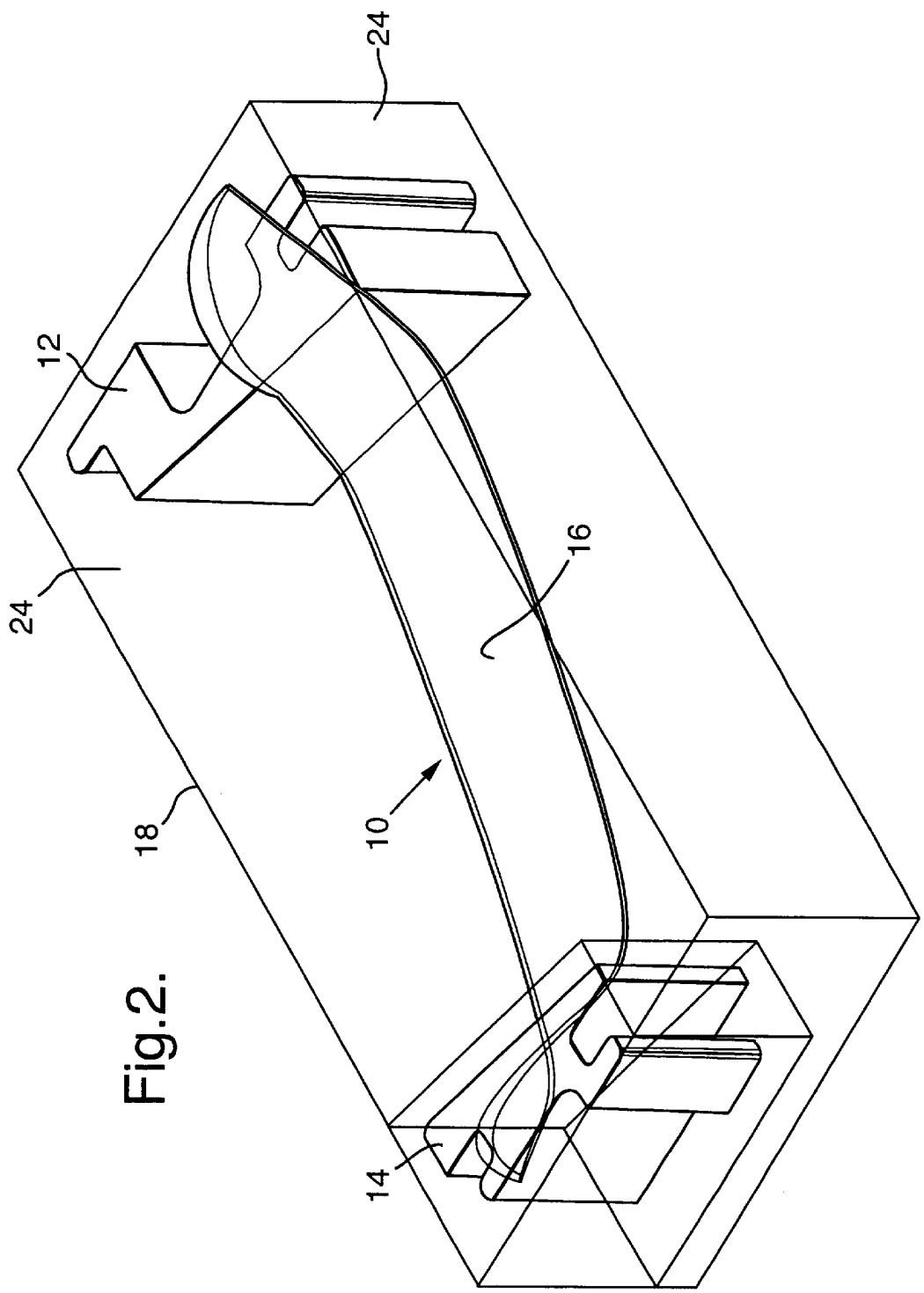
FIG. 2 illustrates an envelope around the blade of FIG. 1.
Figure 3:
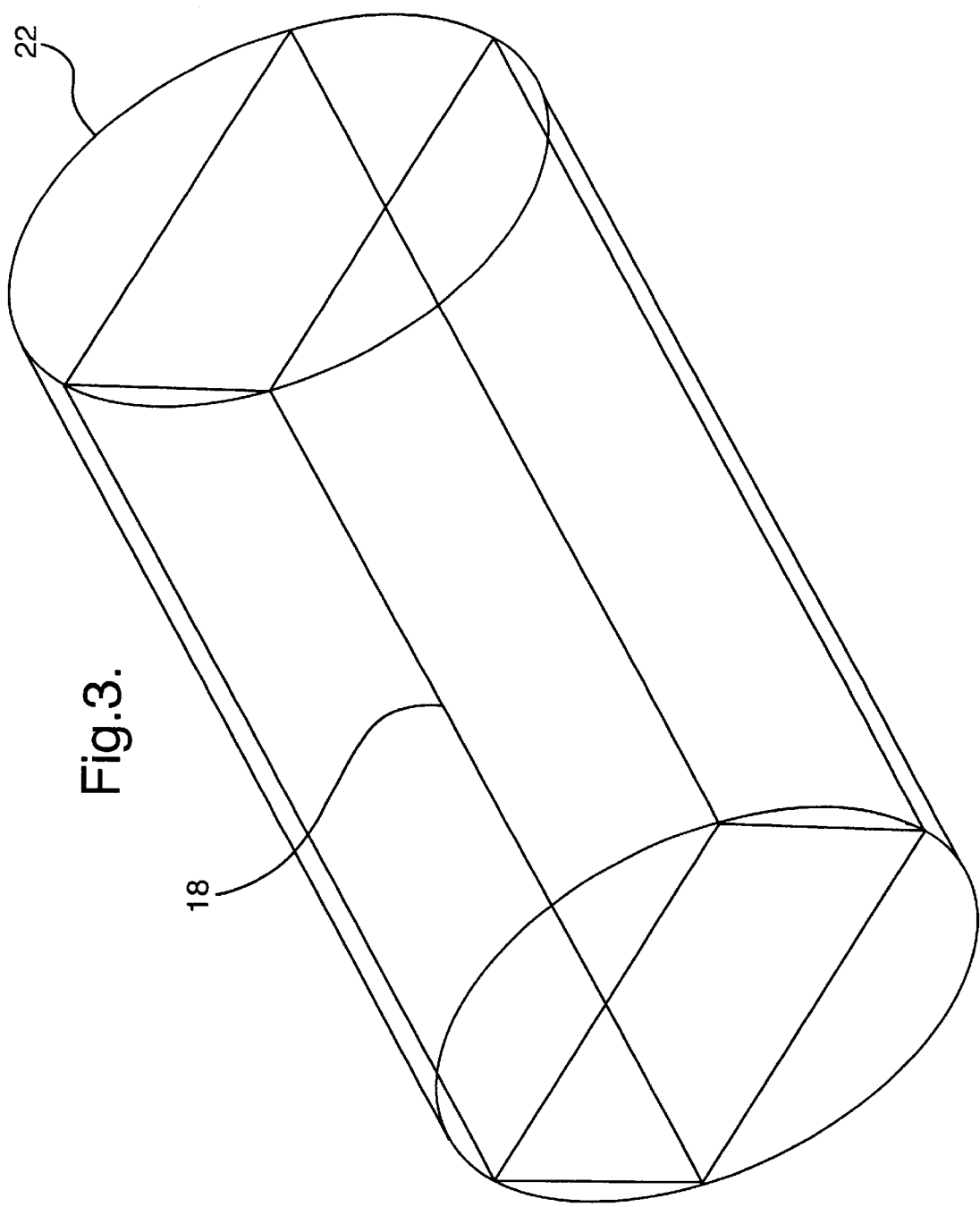
FIG. 3 illustrates a stock bar enclosing the envelope of FIG. 2.

In FIG. 2, the blade 10 is shown wholly within an envelope 18. The envelope 18 thus represents the shape of a block of material from which the compressor blade 10 can, in principal, be machined. The envelope 18 is rectilinear, i.e. having orthogonal faces forming a parallelepipedon. Other common non-orthogonal shapes could be used, but preferably the envelope has planar faces, for reasons which will become apparent. A machine can be used to form a workpiece to the shape of the envelope 18, as follows. First, an image (FIG. 3) is created in which the envelope 18 is shown within a workpiece whose initial shape is a bar of circular section and optimised to contain the envelope 18 with minimum material wastage. That is to say, the workpiece 22 is chosen as the minimum diameter bar (or preferably minimum stock diameter) within which the envelope 18 may be accommodated. Consequently, the image shown in FIG. 3 allows the identification of a sequence of one or more sequence steps by which the workpiece 22 can be formed to the shape of the envelope 18.

Figure 4:
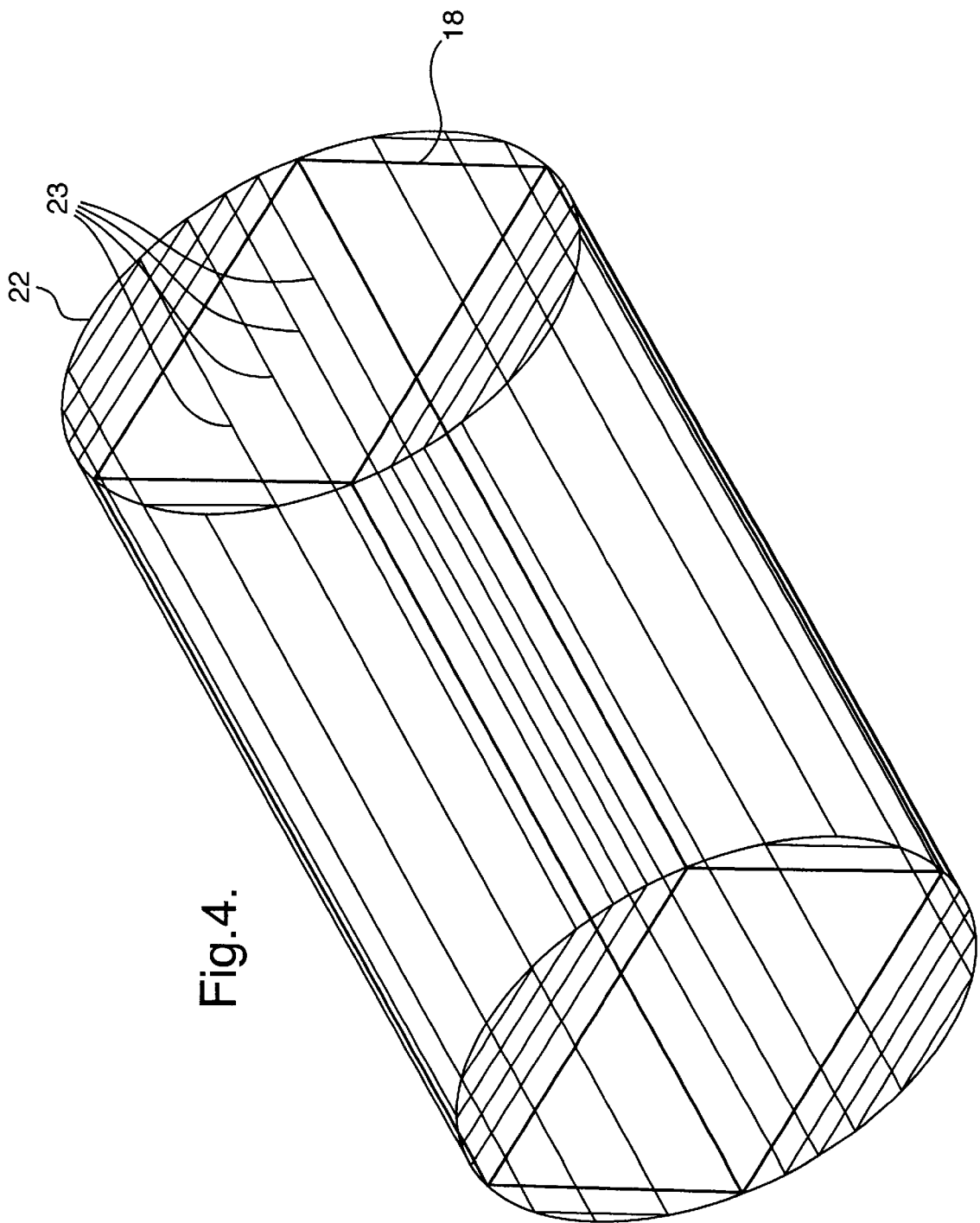
FIG. 4 illustrates cuts to be made in the stock bar.

FIG. 4 illustrates a sequence of cuts 23 of an end cutting milling machine by which four planar faces 24 of the envelope 18 can be created by repeated milling away of the material of the workpiece 22. During these cuts, the workpiece 22 will be held in a chuck 20 (omitted from the drawings, for clarity) by means of a stub of material (not shown).

It can be seen that in the cutting sequences of FIG. 4, each cut produces a new planar surface on the workpiece 22, each successive face being of larger area than the previous face, thus allowing the material of the workpiece to be cut away until the four planar faces 24, are created. By continuing in this manner, all four faces can be created until the workpiece 22 has the shape of the envelope 18, as shown in FIG. 5, which also shows a stub 26 by which the workpiece may be held in a chuck.

Figure 5:
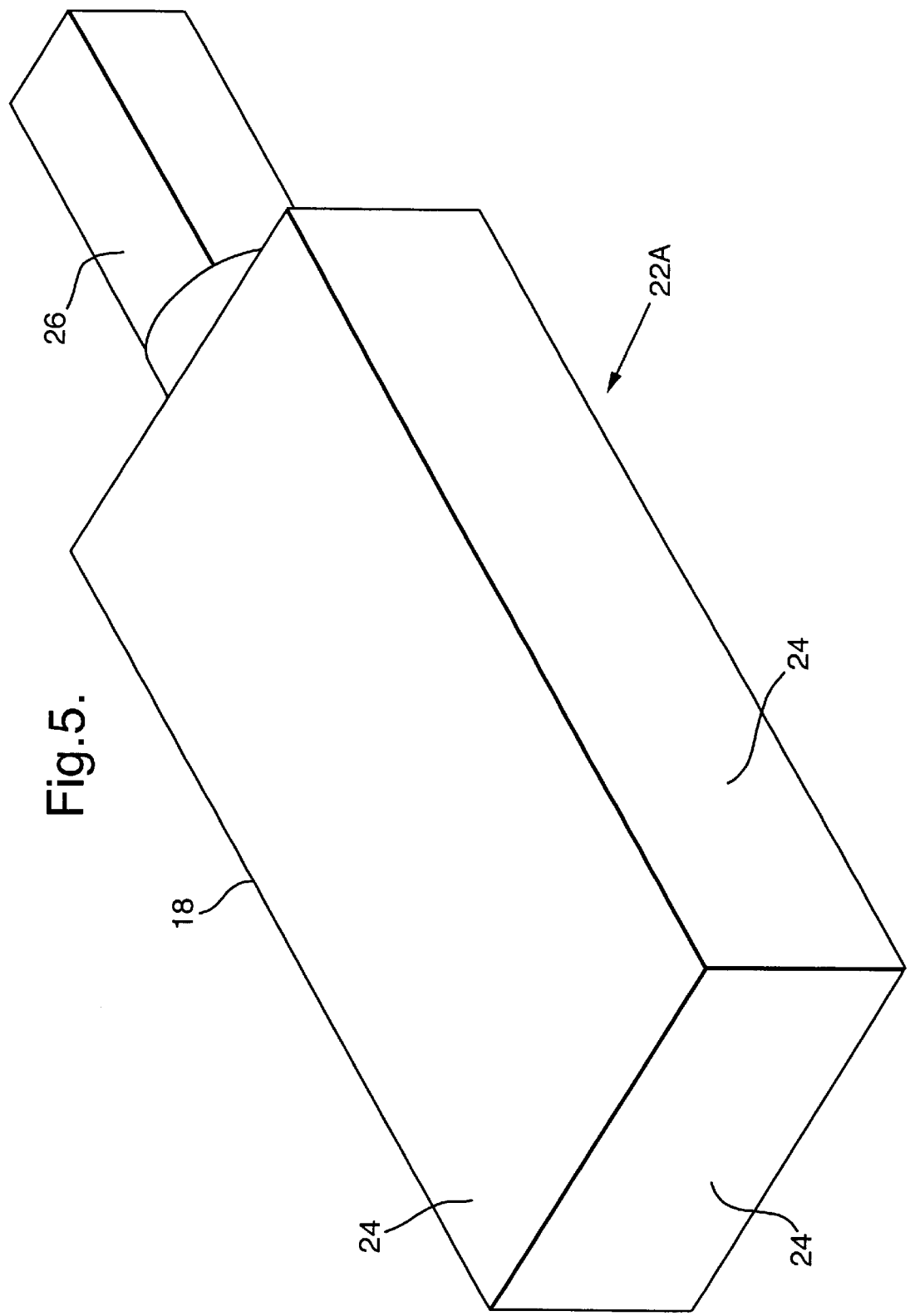
FIG. 5 illustrates the stock bar after the cuts.

Thus, in producing the workpiece 22A shown in FIG. 5, the method first identified the final shape required for the workpiece (i.e. the shape of the blade 16) and then enclosed this within the envelope shape 18, so that the whole of the final shape of the blade was contained in the envelope 18. The machining steps necessary to work the workpiece to the shape of the envelope 18 were then identified.

Figure 6:
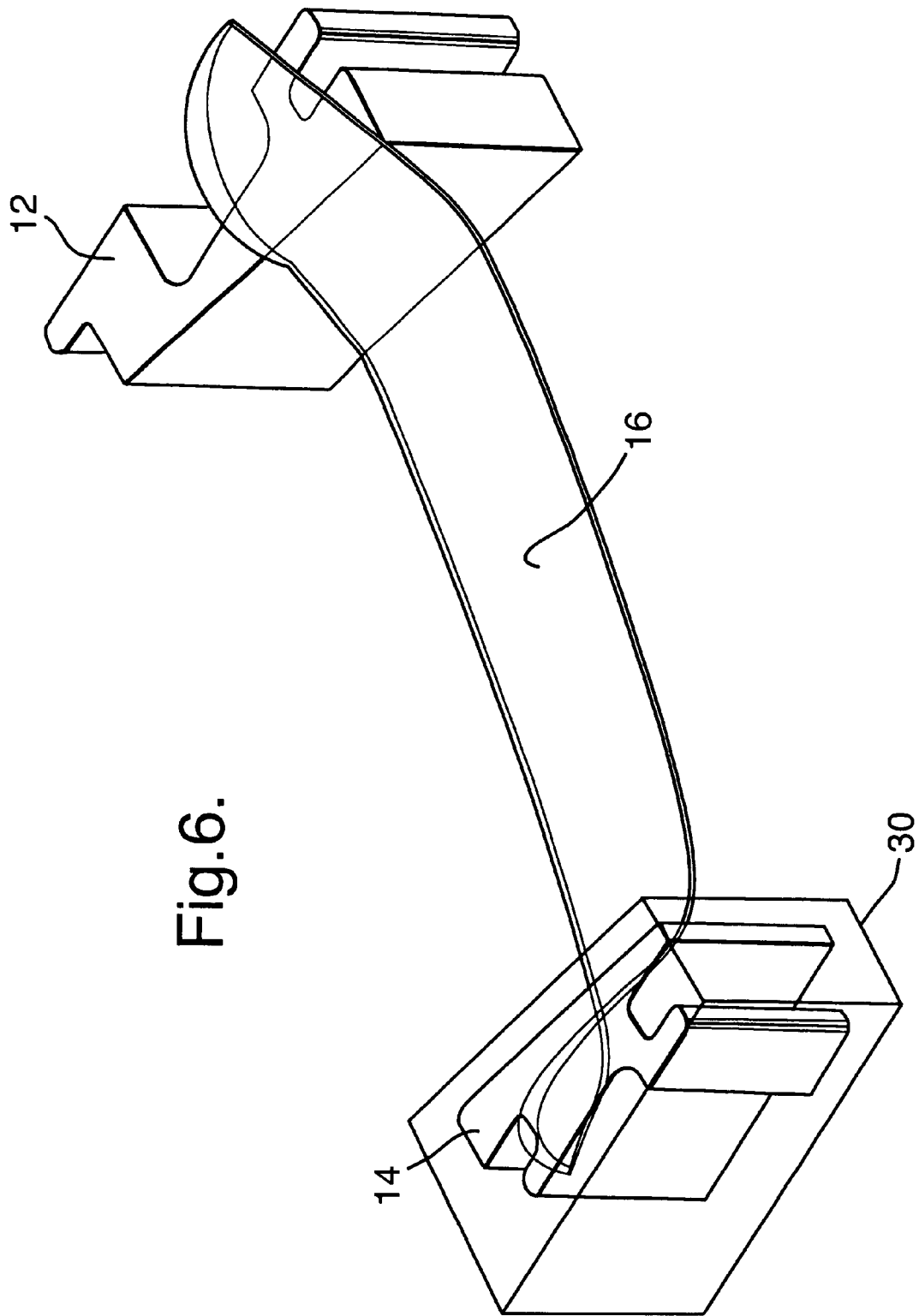
FIG. 6 illustrates an envelope around the shroud of the blade.

At the completion of this first stage of machining, the workpiece 22 is simply a parallelepipedon whose dimensions are determined by the extreme outer dimensions of the blade 16. However, the sequence can then be repeated, as follows. The second stage may seek to machine more precisely a part of the workpiece 22A, such as the shroud 14. Taking the shape of the shroud portion 14 as shown in FIG. 6 as the required final shape, a second envelope 30 is generated which wholly contains the shroud 14. As can be seen in FIG. 6, the envelope 30 again has planar faces but is much smaller than the envelope 18 (FIG. 2). Superimposing of the envelope 30 on the envelope 18 (FIG. 7) allows the identification of material (shaded in FIG. 7) which may be removed from the workpiece 22A while leaving sufficient material within the envelope 30 to allow the correct formation of the shroud 14. Consequently, having identified the material shown shaded in FIG. 7, a sequence of planar cuts can be identified in order to remove the shaded material from the workpiece 22A.

The sequence of identifying a final shape, generating an envelope shape wholly containing that final shape and then identifying a sequence of machining steps to form the workpiece to the envelope shape can be repeated again for the blade 16 and then for the root portion 12 until a fourth workpiece 22B (FIG. 8) has been produced. Although still coarsely cut, the workpiece 22B is now exhibiting three clearly distinguishable parts which will ultimately form the root 12, shroud 14 and blade 16.

Figure 9:
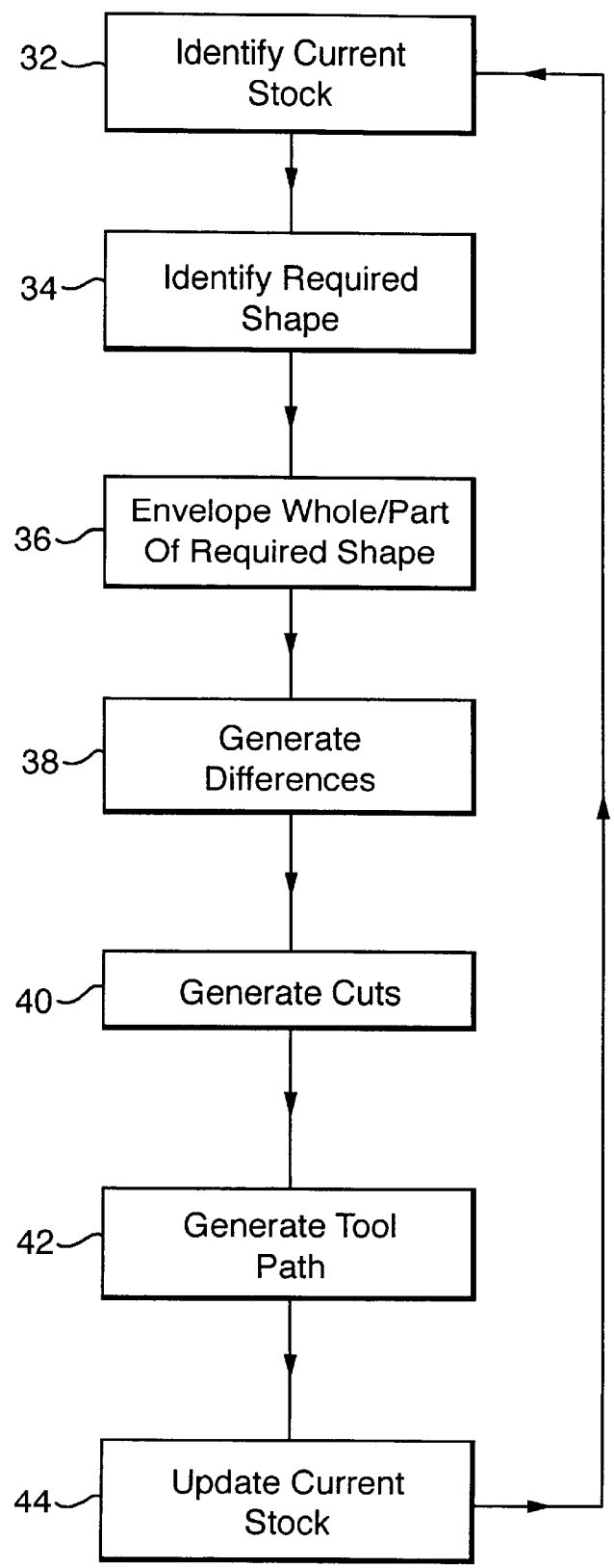
FIG. 9 is a flow diagram of the steps of the method of the invention.

The sequence for identifying each set of cuts can be summarised by the flow diagram of FIG. 9. At step 32, the current stock model is identified. Initially this will be the round bar but subsequently will be an intermediate workpiece 22A, 22B etc. In the case of the first sequence, the final shape required for the whole of the workpiece is identified at 34 but in subsequent sequences, step 34 will identify the final shape required for part of the workpiece, such as the root. An envelope is then created around the final shape at 36. Step 38 makes a comparison between the shape of the envelope and the stock shape, to identify the material to be cut away. A sequence of cuts is then generated at step 40. Having identified the required sequence of cuts, a tool path to create those cuts may be generated at step 42. Once the tool path has been generated at 42, it is preferably stored as a file with instructions suitable for providing to an automated machine such as a CNC machine. The file of instructions may be encoded in a generic manner or, if the particular machine tool has been identified as part of the procedure, may be encoded in a specific manner intended for that machine tool.

Finally, step 44 updates the definition of the current stock model, to the shape which will result when the cuts identified at step 40 have been executed. The cycle then commences again to create a further sequence of machining steps for more detailed machining of part of the workpiece, or for machining of an alternative part of a workpiece. In this sense, the invention provides a form of iterative machining.

Each step of the iterative machining can be optimised in various ways. First, the envelopes created should be optimised, preferably to be the closest possible fit around the final shape required, subject to any allowance require for leaving additional material for finish machining. This quality of fit may be judged, for instance, by reference to the volume of the envelope, or the cross sectional area, particularly when the envelope is a prism. Where the part being enveloped has a planar or generally planar surface, it is desirable for the envelope to have a planar face alongside.

The cutting sequence can also be optimised, for instance by changing the choice of tool, size or type, the depth of cuts, and the number of cuts used to reach the envelope from the initial shape. These considerations are preferably taken into account as part of steps 36, 40, 42 of the procedure.

Figure 10:
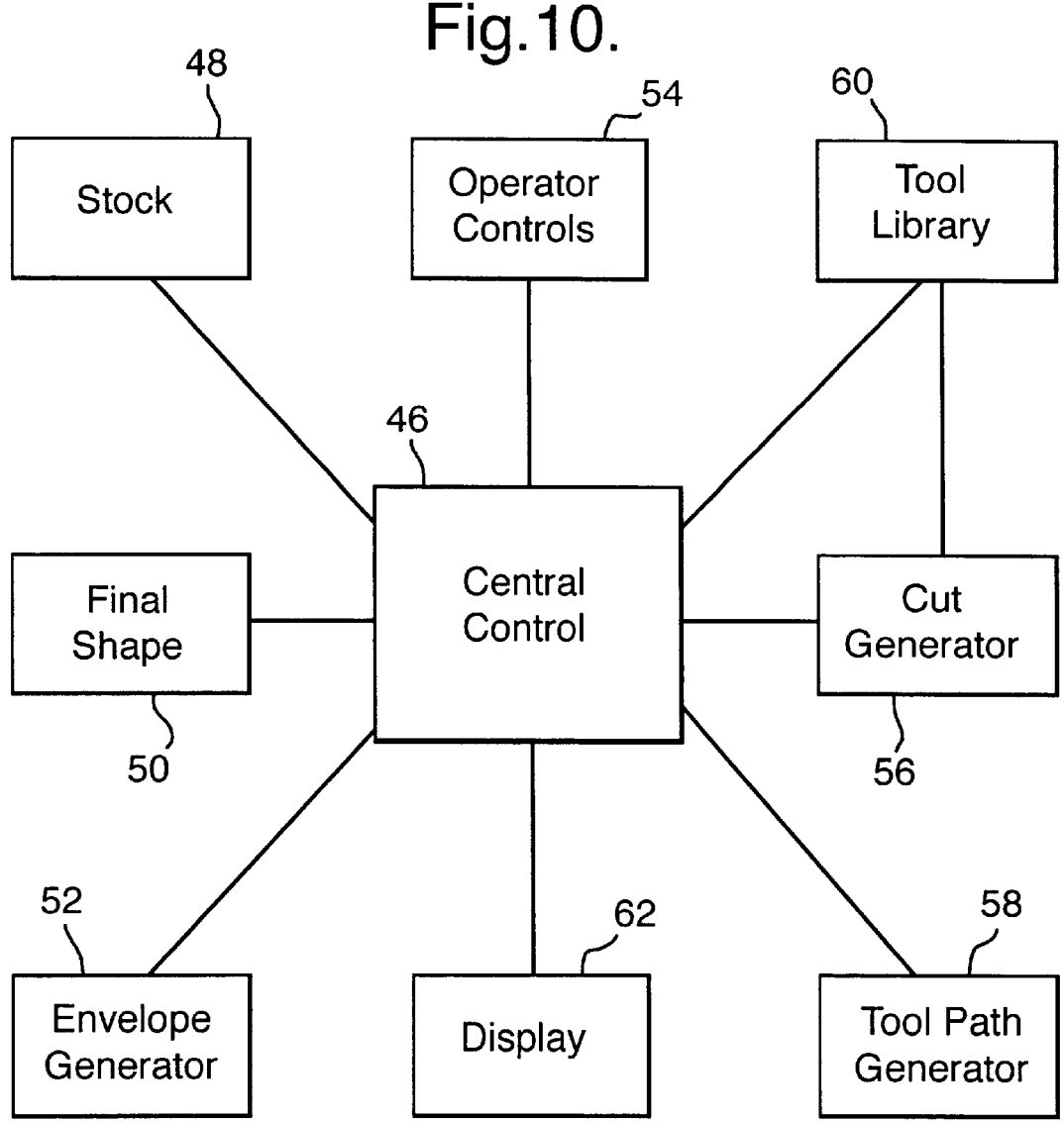
FIG. 10 is a block diagram of apparatus for implementing the method.

FIG. 10 is a highly schematic block diagram of apparatus for implementing the procedure of FIG. 9. In FIG. 10, a central control block 46, which may be implemented as a computer or microprocessor control module, co-ordinates the execution of the procedure by interaction with the other modules illustrated. First, the control 46 will interrogate a stock record 48 to determine the current stock model (step 32). The control 46 is also able to interrogate a record 50 of the final shape (step 34) and then instruct an envelope generator 52 to develop an envelope (step 36) as has been described and subject to any restrictions which might be imposed by an operator through operator controls 54. Having developed the envelope, the material to be cut away can be identified as described above (step 38), allowing the control 46 to instruct a cut generator 56 to generate a set of cuts (step 40) to cut the stock shape down to the envelope shape. Having identified the cuts required, a tool path (step 42) generator 58 is instructed to create a tool path to implement the cuts required by the cut generator 56. The current stock model in the stock record 48 is then updated.

It can be seen that each of the generator modules 52, 56,58 can be provided with appropriate algorithms to perform its function, subject, in each case, to any restrictions imposed by the operator through the controls 54.

For reasons of versatility and practice, it is likely that the procedure will require the choice of an appropriate tool. This choice may be made either by the operator or as a result of analysis carried out in the procedure. In either event, a tool library 60 is desirable, containing information about the tools available, such as sizes, maximum permitted cut depths, speeds etc. This information will be available to the cut generator 56 and particularly to the toolpath generator 58.

At each stage through the procedure, it is desirable for the control 46 to provide the operator with an image (similar to those of the drawings described above) to indicate how the procedure is progressing, and in particular to illustrate the envelopes, sequences of cuts and the tool path which have been generated. It is particularly desirable for the control 46 to create an animated image showing the tool being used in accordance with the generated tool path to execute the generated cuts to create the envelope shape from the stock model. This simulation, and all other images for the operator, are provided by the control 46 by means of a suitable display 62, such as a VDU. This allows the operator to be fully informed of decisions being taken within the procedure, and of the effect of any choices made by the operator, such as tool choices.

The modules illustrated in FIG. 10 may be implemented as integrated or discrete modules, any of which may be primarily hardware, primarily software or a mixture of hardware or software.

The coarse machining described above in relation to FIGS. 2 to 10 results in a rough blank (FIG. 8) which lacks many features of detail in comparison with the required shape of the blade 10. The blade 16, for instance, lacks the complex shape required. We have identified two alternatives for creating finer details such as that of the blade 16, as follows.

Figure 11:
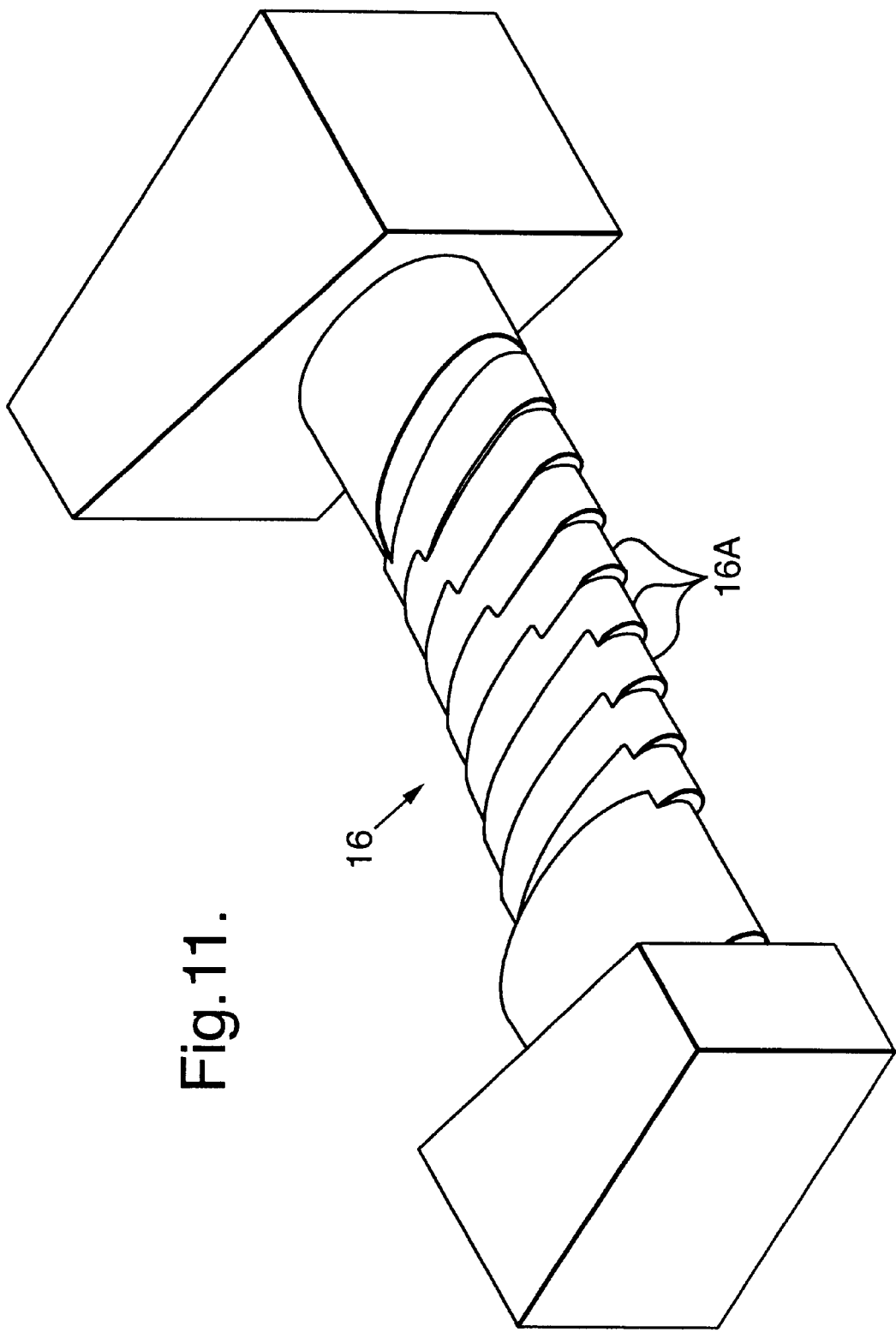
FIG. 11 is a perspective view showing an aerofoil machined according to a first enveloping technique.

In a first alternative, the blade 16 can be divided notionally into a group of thin slices 16A along its length from the root 12 to the shroud 14. Each slice is assumed to have constant cross section perpendicular to the length of the blade 16 but the cross section of each slice, and particularly the orientation of each slice around the longitudinal axis of the blade, may vary from that of its neighbours. Each slice will therefore be a prism of irregular polygonal cross section. By consideration of each slice in turn, the shape of the corresponding polygon can be optimised to the shape of the blade at that point along its length (step 36 of FIG. 9) to fit the prism as an envelope around that part of the blade 16. A closer fit will be possible if the number of sides on the polygon is increased, but each side corresponds to at least one cut, so that the number of cuts will therefore increase. This would produce a more accurate shape at the expense of slower production time. Consequently, the operator may wish to experiment by setting the number of polygon sides, judging the quality of the fit then attained between the envelope and the blade, and possibly changing the required number of polygon sides as a result. Thus, the procedure of FIG. 9 is implemented for each slice of the blade 16 to create a polygonal prism which closely envelopes that part of the blade 16, and to generate a tool path to cut the workpiece to that shape. After applying the procedure in this manner to each slice along the length of the blade, a complete set of tool paths will be created by which the workpiece may be cut to leave a rough cut blade closely resembling the final shape required, as illustrated in FIG. 11. It is envisaged that by using a large number of facets for each slice, such as 13, and by using a large number of slices, such as slices with width approximately 1 cm, a blade can be created ready for finish machining.

The division of the blade 16 into slices readily allows the procedure of FIG. 9 to be applied to the twisted shape of the blade 16 while ensuring that at any point along the blade, relatively little extraneous material remains after cutting. A final step, forming the final preparation for finishing could be to work along the blade 16 with a side cutting tool to remove this extraneous material. Side cutting is less desirable than end cutting, for reasons of speed and tool wear, but may nevertheless be advantageous once end cutting of slices has been used to remove bulk material, as described.

Figure 12:
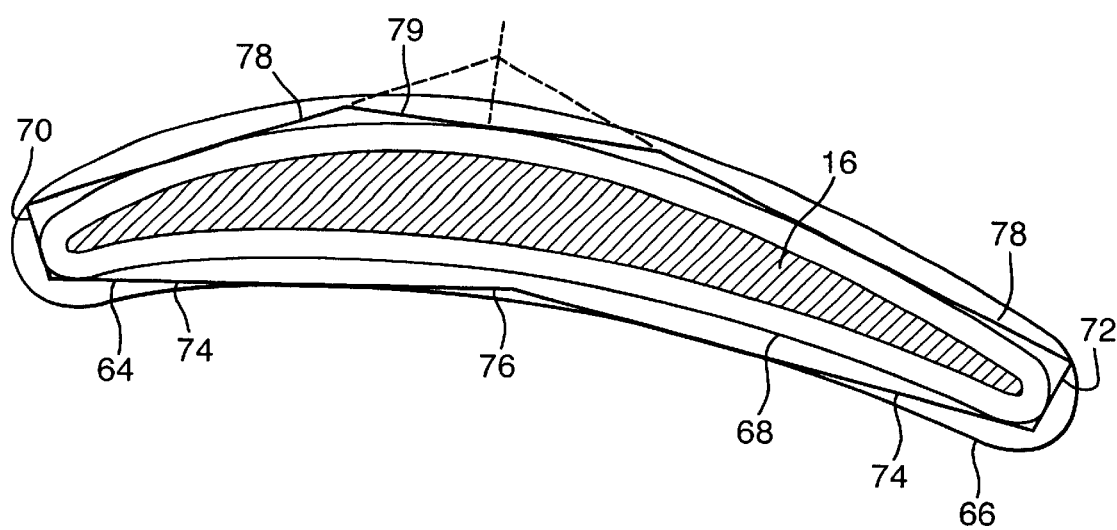
FIG. 12 illustrates an alternative enveloping technique.

However, we envisage that in principal, side cutting could be used as an alternative to end cutting, as follows. First, a section through the blade 16 is considered (FIG. 12) and a two dimensional polygon 64 is fitted around the blade 16, as an envelope. In FIG. 12, the blade 16 is shown hatched, and surrounded by a line 66 indicating an allowance for final finish machining (such as 2 mm allowance) and a further line 68 half way between the blade surface and the allowance line 66 (i.e. indicating 1 mm allowance). Relatively simple rules allow a polygon to be fitted as an envelope around the blade 16 and within the allowance envelope 66, as follows. First, leading and trailing edge facets 70, 72 are created each as a line normal to the camber line of the aerofoil and tangent to the half-allowance line 68. Two pressure side facets are then created as tangents between leading and trailing edges of the half-allowance envelope 68 and the allowance envelope 66. It is to be particularly noted that these facets 74 met at a concavity 76. Suction side facets 78 are struck from the point where the leading and trailing edge facets 70, 72 intersect the allowance envelope 66 and are tangent to the half allowance envelope 68. The third facet 79 on the suction side is tangent to the half-allowance envelope 66 and normal to the point of intersection of the other two suction facets 78. Thus, it can be seen that the seven-sided polygon so formed lies wholly within the allowance envelope 66.

An additional facet may sometimes be required at the concavity 76, especially if the blade is particularly curved, or allowances are small.

The procedure just described is equivalent to the generation of a two-dimensional envelope at step 36 of FIG. 9. The necessary cuts and tool paths can then be generated in the manner described above. However, in this example, we envisage that the analysis just described will be continued along the blade 16, taking into account the twisting of the blade 16, in order to create a series of seven paths for side cutting (or flank milling) each path corresponding to one of the various facets described. Thus, rather than forming the blade 16 in slices by cutting perpendicular to the length of the blade 16 to form each slice, the blade is formed by a series of seven flank cutting operations along the length of the blade 16.

The description above has considered the formation of envelopes around parts of the final shape required. We have developed a technique by which this may be more readily achieved as follows.

The control 46 and associated modules, including the display 62 preferably form part of a CAD system, or function in a manner analogous to a CAD system. The principals of CAD systems and the manner of storing images will be well understood by the skilled reader.

We envisage that before the procedure of FIG. 9 begins, the article to be produced (i.e. the blade 10) is notionally divided into a set of objects each of which represents a different part of the article. For instance, the root 12 may form one object, the shroud 14 another, and the blade 16 another. Each of these objects may be further sub-divided into a group of smaller objects. An image of each object is stored separately i.e. as a separate CAD object, so that each may be viewed or otherwise considered alone. However, each object image is stored in association with reference data which defines the position of that object relative to the complete article or other frame of reference which is common to all of the objects. Thus, any object can be viewed individually, in which case its relationship with other objects is not relevant. Alternatively, groups of more than one object may be viewed, and in creating an image of this nature the control 46 will take account of the reference data and create an image in which the objects of the group are shown in their correct spatial relationship one to the other. This is achieved by use of the reference data. It is particularly preferred that images are presented for viewing in the orientation they would have during machining, to assist the quality of the simulation to the eye of a production worker.

Figure 7:
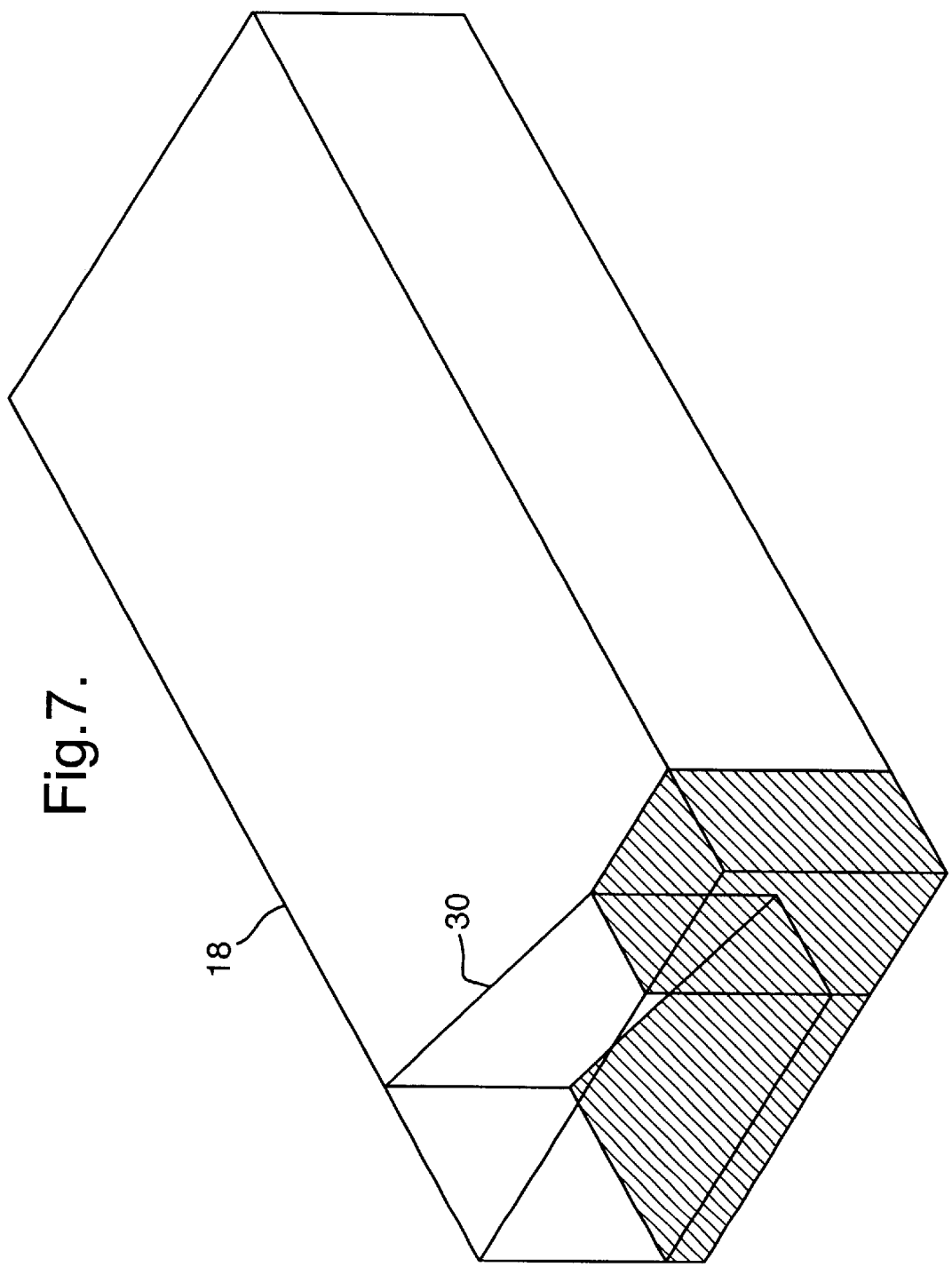
FIG. 7 shows the blade and shroud envelopes superimposed.
Figure 8:
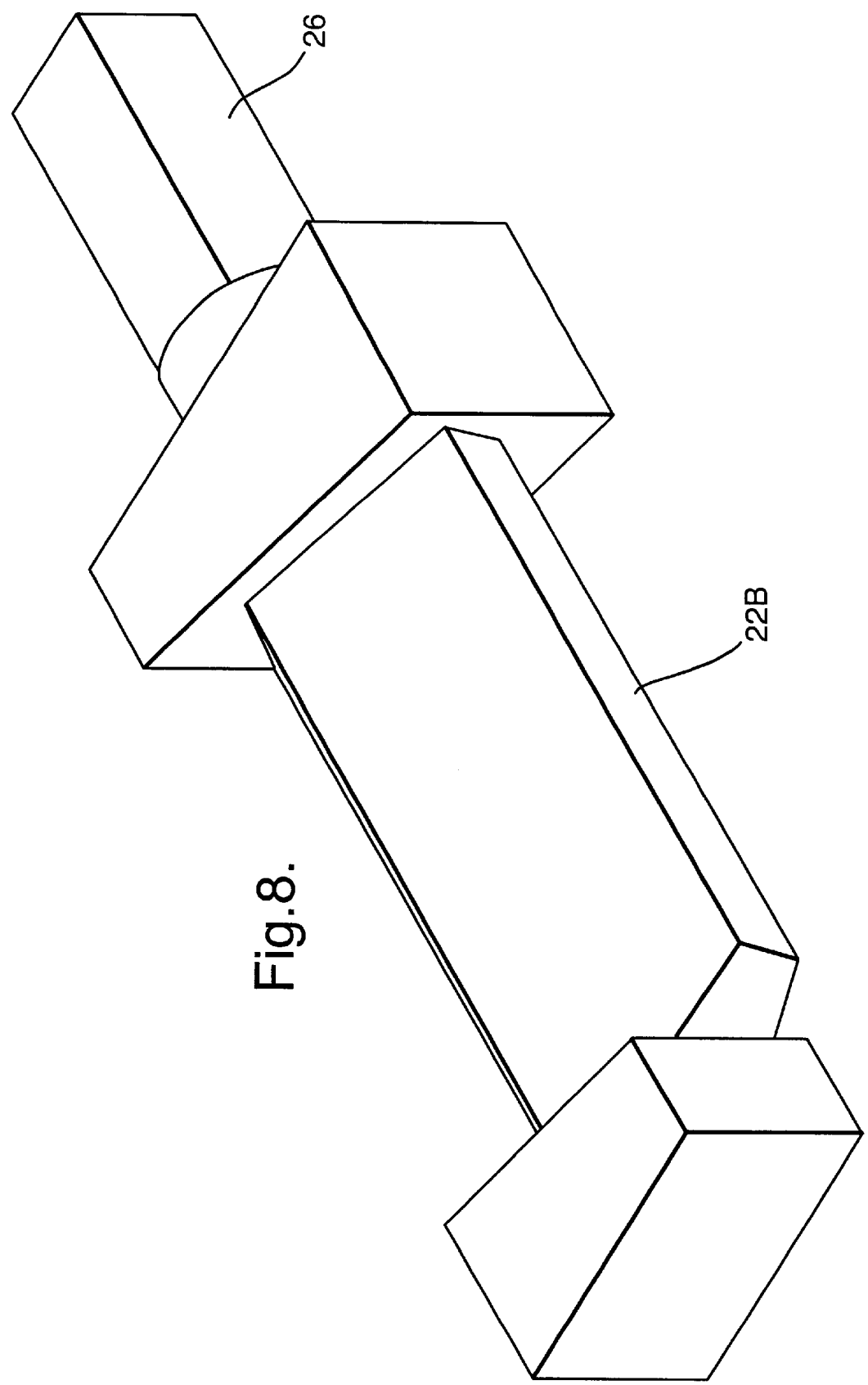
FIG. 8 shows an intermediate mechanical part.

This principle is also used when superimposing envelopes, as shown in FIG. 7

This feature is significant in a number of ways. First the creation of an envelope around one part of the article, such as the root 12, can be more readily achieved by an operator viewing the image of the root 12 as an object in isolation. Thus, the operator can consider the envelope for the particular object, without distraction of other objects. Furthermore, any algorithms will be applied to data representing only the image of the object. Alternatively, objects could be handled in groups so that, for instance, an envelope could be developed around the root and blade together, if appropriate. Thus, any image may be of a single object or of a group, and objects may be assembled into groups, or sub-divided to become themselves a group.

Once the envelope has been created, other objects can be introduced into the view and will then be shown in their correct spatial relation with the enveloped object. Thus, the complexities, which can sometimes be significant, of linking two views together in a CAD system are not required of the operator, who can concentrate on the machining being simulated. As a result, it is envisaged that use of the invention will be readily assimilated by skilled machine tool operators, who might have little or no knowledge of CAD systems and their operation.

Many variations and modifications may be made to the apparatus and methods described above, without departing from the scope of the present invention. The invention has been described in relation to the production of blades for gas turbine engines, but could be applied to the production of many other components, such as cam shafts or other shafts. In the case of a cam shaft, for instance, we would envisage that a separate envelope would be created at various positions along the cam shaft, to allow the creation of features such as central journal bearings, radial arms and the like.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method for machining a workpiece, the method comprising:
   identifying an initial shape of at least one part of the workpiece;
   identifying a final shape required for the at least one part of the workpiece;
   generating an envelope shape, the envelope shape wholly containing the final shape and being wholly contained within the initial shape of the at least one part of the workpiece; and
   identifying a sequence of machining steps to form the workpiece from the initial shape to the envelope shape,
   wherein the identification of each machining step of the sequence of machining steps takes into account the previous machining steps of the sequence of machining steps to minimize tool movement during machining.

2. A method for machining a workpiece, the method comprising:
   performing a first procedure on a workpiece, the first procedure including
      identifying an initial shape of at least one part of the workpiece,
      identifying a final shape required for the at least one part of the workpiece,
      generating an envelope shape, the envelope shape wholly containing the final shape and being wholly contained within the initial shape of the at least one part of the workpiece,
      identifying a sequence of machining steps to form the workpiece from the initial shape to the envelope shape,
      wherein the identification of each machining step of the sequence of machining steps takes into account the previous machining steps of the sequence of machining steps to minimize tool movement during machining; and
   performing a second procedure on the workpiece, with the second procedure being the same as the first procedure, and with the envelope shape of the first procedure being an initial shape for the second procedure.

3. A method according to claim 1 or claim 2, wherein an image is produced to simulate the performance of the steps of the sequence.

4. A method according to claim 1, or claim 2, wherein the sequence of machining steps is used to create a tool path by which the steps may be executed.

5. A method according to claim 4, wherein the identification of a sequence of machining steps is dependent upon tool size, tool type, the number of cuts to the used to create the envelope shape, or a maximum depth of cut.

6. A method according to claim 4, wherein at least one image is produced to simulate the toolpath for consideration prior to machining commencing.

7. A method according to claim 2, wherein the second procedure is repeatedly applied to a single workpiece, the initial shape for subsequent cycles being an envelope shape produced by the machine sequence of the previous cycle.

8. A method according to claim 1 or claim 2, wherein the envelope shape is three dimensional, surrounding at least part of the workpiece.

9. A method according to claim 8, wherein the envelope shape has at least one planar face.

10. A method according to claim 8, wherein the envelope shape consists entirely of planar faces.

11. A method according to claim 8, wherein the envelope shape is a prism surrounding at least part of the length of the workpiece and having a constant polygonal cross section along an axis.

12. A method according to claim 1 or claim 2, wherein the envelope shape is chosen to optimize the fit of the final shape within the envelope shape by minimizing the volume of the envelope or the surface area of the envelope.

13. A method according to claim 12, wherein the optimisation includes the location of a planar face of the envelope shape against a generally planar surface of the final shape.

14. A computer-readable medium encoded with a program for machining a workpiece, said program comprising:
   identifying an initial shape of at least one part of the workpiece;
   identifying a final shape required for the at least one part of the workpiece:
   generating an envelope shape, the envelope shape, wholly containing the final shape and being wholly contained within the initial shape of the at least one part of the workpiece; and
   identifying a sequence of machining steps to form the workpiece from the initial shape to the envelope shape,
   wherein the identification of each machining step of the sequence of machining steps takes into account the previous machining steps of the sequence of machining steps to minimize tool movement during machining.

15. A method according to claim 1 or claim 2, wherein the machining steps are cuts produced by a flank milling operation, during which the workpiece is turned relative to the tool to produce non linear cutting paths across the workpiece.

16. A computer-readable medium encoded with a program for machining a workpiece, said program comprising:
   performing a first procedure on a workpiece, the first procedure including
      identifying an initial shape of at least one part of the workpiece,
      identifying a final shape required for the at least one part of the workpiece,
      generating an envelope shape, the envelope shape wholly containing the final shape and being wholly contained within the initial shape of the at least one part of the workpiece,
      identifying a sequence of machining steps to form the workpiece from the initial shape to the envelope shape,
      wherein the identification of each machining step of the sequence of machining steps takes into account the previous machining steps of the sequence of machining steps to minimize tool movement during machining; and
   performing a second procedure on the workpiece, with the second procedure being the same as the first procedure, and with the envelope shape of the first procedure being an initial shape for the second procedure.

17. An apparatus for machining a workpiece, the apparatus comprising;
   means for identifying an initial shape of at least one part of the workpiece;
   means for identifying a final shape required for the at least one part of the workpiece;
   means for generating an envelope shape, the envelope shape wholly containing the final shape and being wholly contained within the initial shape of the at least one part of the workpiece; and
   means for identifying a sequence of machining steps to form the workpiece from the initial shape to the envelope shape,
   wherein the identification of each machining step of the sequence of machining steps takes into account the previous machining steps of the sequence of machining steps to minimize tool movement during machining.

18. A computer-readable medium according to claim 14 or 16, wherein the envelope shape is three dimensional, surrounding at least pan of the workpiece.

19. A computer-readable medium according to claim 18, wherein the envelope shape has at least one planar face.

20. A computer-readable medium according to claim 18, wherein the envelope shape consists entirely of planar faces.

21. A computer-readable medium according to claim 18, wherein the envelope shape is a prism surrounding at least part of the length of the workpiece and having a constant polygonal cross section along an axis.

22. A computer-readable medium according to claim 18, wherein the envelope shape is chosen to optimize the fit of the final shape within the envelope shape by minimizing the volume of the envelope or the surface area of the envelope.

23. A computer-readable medium according to claim 22, wherein the optimization includes the location of a planar face of the envelope shape against a generally planar surface of the final shape.

24. An apparatus for machining a workpiece, the apparatus comprising:
   means for identifying a first initial shape of at least one part of the workpiece,
   means for identifying a final shape required for the at least one part of the workpiece,
   means for generating a fist envelope shape, the first envelope shape wholly containing the final shape and being wholly contained within the first initial shape of the at least one part of the workpiece,
   means for identifying a sequence of machining steps to form the workpiece from the first initial shape to the fi envelope shape,
   wherein the identification of each machining step of the sequence of machining steps takes into account the previous machining steps of the sequence of machining steps to minimize tool movement during machining; and
   means for identifying the first envelope shape as being a second initial shape for generating a second envelope shape.

25. A computer-readable medium according to claim 14 or 16, wherein the machining steps are cuts produced by a flank milling operation, during which the workpiece is turned relative to the tool to produce non linear cutting paths across the workpiece.

26. A computer-readable medium according to claim 14 or 16, wherein identification of each machining step of the sequence takes account of the previous steps, to minimize tool movement during cutting.

27. A computer-readable medium according to claim 26, wherein an image is produced to simulate the performance of the steps of the sequence.

28. A computer-readable medium according to claim 26, wherein the sequence of machining steps is used to create a tool path by which the steps may be executed.

29. A computer-readable medium according to claim 28, wherein at least one image is produced to simulate the tool path for consideration prior to machining commencing.

30. A computer-readable medium according to any of claim 14 or 16, wherein the method is repeatedly applied to a single workpiece, the initial shape for the second and subsequent cycles being an envelope shape produced by the machine sequence of the previous cycle.

* * * * *